Figure 1:
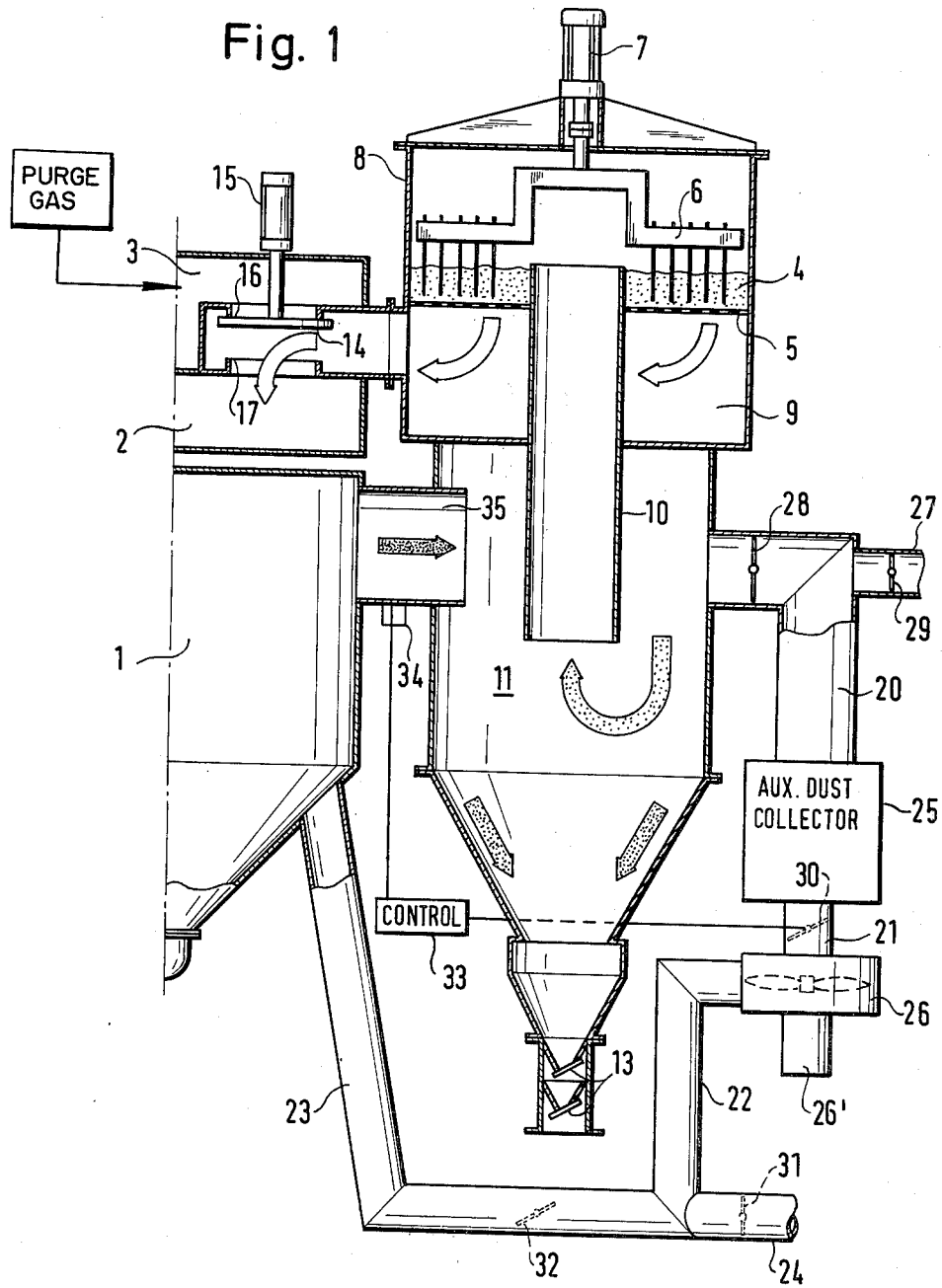

United States Patent [19]
Berz

[11] 3,917,472
[45] Nov. 4, 1975

[54] APPARATUS FOR PURIFYING A RAW GAS OR SUSPENDED SOLID PARTICLES

[76] Inventor: Wolfgang Berz, Mauerkircherstrasse 13, 8000 Munich 80, Germany

[22] Filed: Sept. 23, 1974

[21] Appl. No.: 508,434

[30] Foreign Application Priority Data
Oct. 15, 1973 Germany............................ 2351613

[52] U.S. Cl. ..................... 55/282; 55/337; 55/338; 55/349; 55/512; 55/DIG. 34
[51] Int. Cl.²......................................... B01D 41/02
[58] Field of Search ............ 55/288, 291, 293, 302, 55/337, 344, 345, 258, 260, 466, 473, 417, 479, 512, 515, 315, 338, 418, DIG. 34, 271, 272, 282, 349; 302/11; 209/144

[56] References Cited
UNITED STATES PATENTS
| | | | |
|---|---|---|---|
| 2,087,645 | 7/1937 | Hermann............................ | 209/144 |
| 2,498,832 | 2/1950 | Watson et al........................ | 209/144 |
| 3,146,080 | 8/1964 | Ruble et al. ........................ | 55/315 X |
| 3,257,798 | 6/1966 | Hass.................................. | 55/345 X |
| 3,424,501 | 1/1969 | Young................................ | 55/302 X |
| 3,473,300 | 10/1969 | Wilm et al. ......................... | 55/302 |
| 3,564,570 | 2/1971 | Lincoln et al....................... | 55/291 |
| 3,594,991 | 7/1971 | Berz et al.......................... | 55/302 X |

FOREIGN PATENTS OR APPLICATIONS
| | | | |
|---|---|---|---|
| 541,687 | 12/1931 | Germany............................ | 55/302 |

*Primary Examiner*—Frank W. Lutter
*Assistant Examiner*—David L. Lacey
*Attorney, Agent, or Firm*—Hans Berman

[57] ABSTRACT

A dust collector arrangement in which a filter chamber separated into two compartments by a layer of particulate filter medium receives partly purified gas from a centrifugal separator, and the filter layer is regenerated periodically by blowing collected dust particles back into the separator, is provided with an auxiliary circuit arranged between the separator and the source of raw gas communicating with the separator. The auxiliary circuit includes a cyclone separator of smaller effective diameter than the centrifugal separator.

6 Claims, 2 Drawing Figures

APPARATUS FOR PURIFYING A RAW GAS OR SUSPENDED SOLID PARTICLES

This invention relates to apparatus for purifying a raw carrier gas of solid particles suspended therein, and particularly to an improvement in the type of purifying apparatus disclosed in U.S. Pat. No. 3,594,991.

The earlier patent discloses a gas treating apparatus in which a raw carrier gas having solid particles suspended therein is first passed through a centrifugal separator of a purifying unit for removing coarse particles, and the partly purified gas is then passed through a layer of particulate filter medium in a filter chamber to remove fine particles. When the filter medium is saturated, a purging gas is forced therethrough in a direction opposite to the normal flow of carrier gas, the stream of purging gas carrying solid particles dislodged from the filter medium is passed through the centrifugal separator of another unit of the same type for partial purification, and the partly purified gas is then filtered in a layer of particulate filter medium.

A centrifugal separator designed to remove coarse particles from raw carrier gas at high flow rates and relatively low concentration of particulate impurities is not very effective in removing a high concentration of fines from a purging gas so that a large portion of the fines dislodged from a first filter medium is merely transferred to a second filter medium, and much of the filtering capacity of the latter is consumed in the regeneration of the first medium.

It is an object of the present invention to avoid this shortcoming of the known purification apparatus.

According to this invention, a unit of the type described is provided with an auxiliary circuit which includes an auxiliary dust collector and conveying means for conveying gas through the auxiliary circuit from the centrifugal separator through the auxiliary dust collector to the source of raw carrier gas which communicates with the centrifugal separator so that fines may be removed from purging gas by circulating the gas through the auxiliary separator which need not be suitable for normal pre-purification of raw carrier gas, but can be selected for its ability to remove fines. If the auxiliary separator is properly chosen, it may not be necessary to filter the purging gas before it is released to the atmosphere, thereby conserving filtering capacity of the particulate filter medium.

Figure 2:
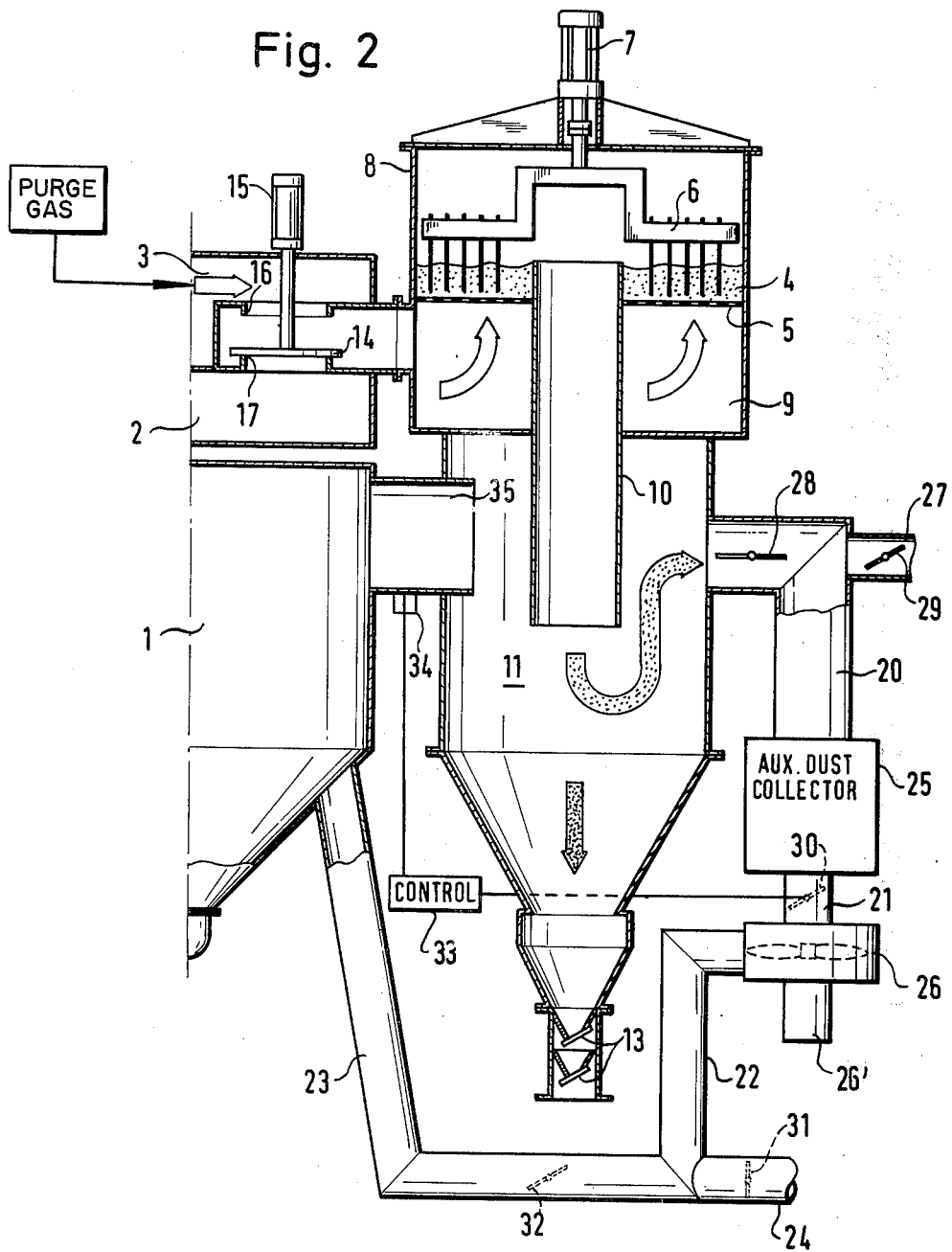

Other features, additional objects, and many of the attendant advantages of this invention will readily be appreciated as the same becomes better understood from the following detailed description of a preferred embodiment when considered in connection with the appended drawing in which:

FIG. 1 shows gas purifying apparatus of the invention in elevation and partly in section and set for purifying a raw carrier gas; and FIG. 2 shows the apparatus of FIG. 1 set for purging of its filter medium.

Referring now to the drawing in detail, there is shown a large preliminary cyclone 1 which serves as a source of raw carrier gas to be purified by several units of the apparatus with which this invention is more specifically concerned. The illustrated unit includes an upright cylindrical housing 8 coaxially superimposed on a centrifugal separator 11 enclosing an interior space which is mainly cylindrical, and whose bottom tapers conically toward a bottom outlet provided with valve flaps 13.

The housing 8 encloses a filter chamber separated into two compartments by a generally horizontal layer 4 of sand, gravel, or like particulate filter medium which passes the carrier gas to be purified, but retains particulate solid matter suspended in the raw carrier gas. The layer 4 of filter medium is supported on a screen or grate 5. A rake 6 may be rotated about a vertical axis by an electric motor 7 for agitating the filter medium.

A coaxial tube 10 connects the centrifugal separator 11 with the filter chamber and has its upper orifice above the surface of the filter medium 4. A short and wide connecting tube 35 connects the preliminary cyclone 1 with the separator 11. The lower compartment 9 in the housing 8 may be connected alternatively with a discharge conduit 2 for purified gas or with a supply conduit 3 for a purging gas through a valve assembly including a valve disc 14 mounted on the piston rod of a pneumatic valve actuator 15 which alternatively places the disc 14 on a seat 16 on the supply conduit 3 or on a seat 17 on the discharge conduit 2.

The apparatus described so far is basically known from the afore-described patent. The improvement contributed by the instant invention resides mainly in an auxiliary circuit including sequentially connected conduits 20, 21, 22, and 23. The conduit 20 leads from the centrifugal separator 11 to an auxiliary dust collector 25 which is of the known Multi-clone type (see Chemical Engineers' Handbook by Perry and Chilton, 5th ed., McGraw Hill Book Co., 1973, page 20–84). The dust collector 25 essentially consists of about 10 to 20 identical centrifugal separators arranged in parallel and each operating on the same principle as the separator 11, but having individual effective diameters which are much smaller than one half of the effective diameter of the separator 11, and an even smaller fraction of the effective diameter of the preliminary cyclone 1. Since the smallest particle size that can be precipitated effectively under otherwise identical conditions is a function of the effective diameter of a centrifugal separator, the auxiliary dust collector readily precipitates fines that cannot be removed by the centrifugal separator 11.

The conduit 21 connects the gas outlet of the dust collector 25 with a circulating fan 26 driven by an electric motor 26'. The discharge conduit 22 of the fan 26 is connected with the conduit 23 which leads into the preliminary cyclone 1. Where the conduits 22, 23 are joined, a branch conduit 24 controlled by a valve flap 31 leads to the atmosphere. A valve 28 is arranged in the conduit 20 near its orifice to the separator 11. A branch conduit 27 leading into the conduit 20 and provided with a value 29 permits an agglomeration aid to be injected into the flow path of the auxiliary circuit. An additional valve 32 is provided in the conduit 23.

The short conduit 21 is provided with a control valve 30 operated by a controller 33. The latter is connected with a pressure sensor 34 in the connecting tube 35.

FIG. 1 shows the apparatus in its filtering mode in which it operates in a known manner and the auxiliary circuit is shut off by the closed valve 28. The devices which cause gas to flow through the preliminary cyclone 1, the centrifugal separator 11, and the housing 8 into the purified gas discharge conduit 2 have not been illustrated since they may be conventional, and are not in themselves a part of the invention. If the purified gas is hot, and the conduit 2 leads to a high stack, no other gas conveying apparatus need be provided.

The coarsest solid particles are retained in the preliminary cyclone 1, a somewhat finer fraction is retained in the centrifugal separator 11 and released from time to time through the bottom valves 13, and the fines are filtered from the carrier gas by the sand or gravel in the layer 4. The valve disc 14 sealingly engages the valve seat 16 on the supply conduit 3 permitting flow of the purified gas into the discharge conduit 2. The path of gas flow is indicated by arrows partly stippled to indicate contaminating solid particles.

When the filter medium in the layer 4 is to be regenerated, the valve disc 14 is shifted to the seat 17, as is shown in FIG. 2, to admit purging gas from the supply conduit 3. The valve 28 is fully opened, and the valve 29 may be opened from time to time to admit an agglomeration aid, such as a spray of atomized water containing a small amount of wetting agent. The fan motor 26' is energized, and the valve 30 is opened by the controller 33 to maintain a pressure in the connecting tube 35 sufficient to prevent gas flow from the separator 11 into the cyclone 1.

Purging gas, such as atmospheric air, is drawn by the fan 26 into the supply conduit 3, passes upward through the filter medium 4 while the latter is being agitated by the rotating rake 6, and the solid particles dislodged from the filter medium are carried by the purging gas into the separator 11 where they are partly deposited and discharged through the bottom valves 13 from time to time. A large portion of the particles, particularly the finest fraction, enters the auxiliary circuit through the open valve 28. Agglomeration aid injected through the branch conduit 27 where the conduit 20 bends in an angle of 90° causes partial agglomeration of the finest particles in the turbulent flow zone adjacent the bend, and most, if not substantially all, the particles are precipitated in the auxiliary dust collector 25 and discharged from the same through a non-illustrated bottom valve, analogous to the valves 13.

If the gas discharged from the dust collector 25 through the fan 26 is pure enough, the valve 32 may be closed and the valve 31 opened to discharge the purified purging gas directly to the atmosphere. If this is not permissible or desirable, the valve 31 remains closed and the valve 32 open, as is shown in FIG. 2, and the purging gas is driven into preliminary cyclone 1 to be further purified in another unit connected to the cyclone, identical with the unit illustrated, and operating in the filtering mode shown in FIG. 1. Most, if not all, the particles dislodged from the filtering layer 4 having been separated from the purging gas in the auxiliary dust collector 25, the purging gas does not cause significant loading of the non-illustrated other unit.

If the source of raw carrier gas is not a preliminary cyclone common to several filtering units, an auxiliary filtering unit may be installed in the conduit 22 or the conduit 23, the conduit 23 may lead directly into the connecting tube 35 which constitutes the source of raw gas for the modified unit, and means may be provided for venting the tube 35 for discharging the purified purging gas.

While it is usually preferred to set the controller 33 in such a manner that no significant amount of gas flows through the connecting tube 35 in the illustrated unit, the nature of the purging gas, of the carrier gas to be purified, and other process variables may make it more desirable to set the controller for partial gas flow in either direction, that is, for some raw carrier gas to be circulated through the auxiliary circuit, or some purging gas to by-pass the auxiliary circuit.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In an apparatus for purifying a raw carrier gas of solid particles suspended in said gas, the apparatus including a housing defining a filtering chamber therein, a layer of particulate filtering medium dividing said chamber into a first compartment and a second compartment, a centrifugal separator, a conduit connecting said separator to said first compartment, a source of said raw carrier gas, first connecting means connecting said source with said separator, a source of purging gas, second connecting means connecting said source of purging gas to said second compartment, and discharge means for discharging purified gas from said second compartment, the improvement which comprises:

an auxiliary circuit providing a flow path from said separator to said source of said carrier gas separate from said first connecting means, said auxiliary circuit including a. an auxiliary dust collector;
b. conveying means for conveying gas from said centrifugal separator through said auxiliary circuit and said auxiliary dust collector to said source of said raw carrier gas;
c. pressure sensing means in said first connecting means for sensing the gas pressure prevailing in said first connecting means;
d. a control valve in said auxiliary circuit intermediate said separator and said source of raw gas for controlling flow of gas in said path; and
e. valve operating means connected to said sensing means and to said control valve for operating said control valve in response to a change in the pressure sensed by the sensing means.

2. In an apparatus as set forth in claim 1, said centrifugal separator enclosing a space of substantially circular cross section and having a given effective diameter said auxiliary dust collector comprising a plurality of cyclone separators, the effective diameter of said centrifugal separator being more than twice the effective diameter of each of said cyclone separators.

3. In an apparatus as set forth in claim 1, said conveying means including a circulating fan.

4. In an apparatus as set forth in claim 1, branch conduit means communicating with said auxiliary circuit between said centrifugal separator and said auxiliary dust collector and including means for admitting an agglomeration aid to the gas conveyed through said auxiliary circuit.

5. In an apparatus as set forth in claim 1, said control valve being arranged in said auxiliary circuit between said conveying means and said auxiliary dust collector, said conveying means including a circulating fan.

6. In an apparatus as set forth in claim 5, said auxiliary dust collector, said control valve, and said fan being arranged sequentially in said path.

* * * * *

UNITED STATES PATENT AND TRADEMARK OFFICE
CERTIFICATE OF CORRECTION

PATENT NO. : 3,917,472
DATED : November 4, 1975
INVENTOR(S) : WOLFGANG BERZ

It is certified that error appears in the above-identified patent and that said Letters Patent are hereby corrected as shown below:

In the heading, line /54/, and in column 1, change the title to read -- APPARATUS FOR PURIFYING A RAW GAS OF SUSPENDED SOLID PARTICLES --

Signed and Sealed this tenth Day of February 1976

[SEAL]

Attest:

RUTH C. MASON
Attesting Officer

C. MARSHALL DANN
Commissioner of Patents and Trademarks